(12) United States Patent
Kraiser et al.

(10) Patent No.: US 12,021,825 B2
(45) Date of Patent: Jun. 25, 2024

(54) NETWORK ADDRESS TRANSLATION (NAT) DEVICES CONFIGURED TO RESOLVE NAT STATE SYNCHRONIZATION ISSUES

(71) Applicant: Arista Networks, Inc., Santa Clara, CA (US)

(72) Inventors: Tula Kraiser, Sunnyvale, CA (US); Sebastiano Borgione, Bellevue, WA (US); Prashanth Krishnamurthy, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 17/980,065

(22) Filed: Nov. 3, 2022

(65) Prior Publication Data
US 2024/0154929 A1     May 9, 2024

(51) Int. Cl.
*G06F 15/16* (2006.01)
*G06F 9/54* (2006.01)
*H04L 29/06* (2006.01)
*H04L 61/2517* (2022.01)
*H04L 61/255* (2022.01)
*H04L 61/256* (2022.01)

(52) U.S. Cl.
CPC ........ *H04L 61/256* (2013.01); *H04L 61/2517* (2013.01); *H04L 61/255* (2013.01)

(58) Field of Classification Search
CPC . H04L 61/256; H04L 61/2517; H04L 61/255; H04L 61/2532; H04L 61/2503; G06F 9/45558; G06F 11/2033; G06F 11/2048; G06F 11/2038; G06F 11/2023
USPC .......................................................... 709/221
See application file for complete search history.

(56) References Cited

U.S. PATENT DOCUMENTS

| | | | | |
|---|---|---|---|---|
| 7,042,876 B1 * | 5/2006 | Jayasenan | ........... | H04L 61/2503 370/389 |
| 7,624,195 B1 * | 11/2009 | Biswas | ............... | H04L 61/2521 709/245 |
| 8,289,968 B1 * | 10/2012 | Zhuang | ............... | H04L 61/2532 370/252 |
| 8,656,052 B2 * | 2/2014 | Carothers | ........... | H04L 61/2514 709/245 |
| 8,942,235 B1 * | 1/2015 | Vinapamula Venkata | .................... | H04L 61/503 370/254 |
| 9,178,846 B1 * | 11/2015 | Kamisetty | ............... | H04L 63/02 |
| 9,351,324 B2 * | 5/2016 | Krishna | ................ | H04L 45/745 |
| 9,825,911 B1 * | 11/2017 | Brandwine | ............. | H04L 63/20 |
| 10,129,207 B1 * | 11/2018 | Wan | .................... | H04L 61/2514 |
| 10,469,446 B1 * | 11/2019 | Chigurupati | ........ | H04L 63/0892 |
| 11,323,363 B1 * | 5/2022 | Sanchez | ................ | H04L 69/165 |
| 11,665,131 B1 * | 5/2023 | Subramanian | ...... | H04L 61/2517 709/245 |
| 2010/0077087 A1 * | 3/2010 | Roy | .................... | H04L 67/1023 709/228 |
| 2013/0067110 A1 * | 3/2013 | Sarawat | ................. | H04L 63/30 709/238 |

(Continued)

*Primary Examiner* — Hamza N Algibhah
(74) *Attorney, Agent, or Firm* — Treyz Law Group, P.C.; Tianyi He

(57) ABSTRACT

A network address translation (NAT) device may receive a network packet having a network address for translation. The NAT device may determine whether a translation for the network address exists on the NAT device. The NAT device may forward the network packet to a peer NAT device based on a criterion.

20 Claims, 10 Drawing Sheets

(56) References Cited

U.S. PATENT DOCUMENTS

| | | | |
|---|---|---|---|
| 2013/0301522 A1* | 11/2013 | Krishna | H04L 61/2517 370/328 |
| 2014/0269740 A1* | 9/2014 | Garneij | H04L 61/256 370/401 |
| 2014/0294006 A1* | 10/2014 | Rajsic | H04L 61/2557 370/392 |
| 2014/0301191 A1* | 10/2014 | Ludwig | H04L 47/2441 370/230 |
| 2018/0069782 A1* | 3/2018 | Wosik | H04L 61/2532 |
| 2019/0068487 A1* | 2/2019 | Wosik | H04L 61/2514 |
| 2019/0116033 A1* | 4/2019 | Nicol | H04L 9/14 |
| 2021/0103507 A1* | 4/2021 | Pfister | G06F 9/45558 |
| 2022/0103525 A1* | 3/2022 | Shribman | G06F 16/955 |
| 2023/0261963 A1* | 8/2023 | Gupta | H04L 45/20 370/537 |

* cited by examiner

| MATCH | | ACTION - FORWARD | |
|---|---|---|---|
| HASH(S-IP, PROTOCOL, S-PORT) = ODD | ... | L3 INTERFACE OF NAT DEVICE 1 TO NAT DEVICE 2 | IP OF NAT DEVICE 2 |

| MATCH | | ACTION - FORWARD | |
|---|---|---|---|
| HASH(S-IP, PROTOCOL, S-PORT) = EVEN | ... | L3 INTERFACE OF NAT DEVICE 2 TO NAT DEVICE 1 | IP OF NAT DEVICE 1 |

| | MATCH | | ACTION - FORWARD | |
|---|---|---|---|---|
| 100 ↗ | PROTOCOL = ICMP | INGRESS INTERFACE = NAT INTERFACE (WITH SOURCE NAT) | ... | L3 INTERFACE OF NAT DEVICE 2 TO NAT DEVICE 1 | IP OF NAT DEVICE 1 |
| 102 ↗ | PROTOCOL = ICMP | EGRESS INTERFACE = NAT INTERFACE (WITH SOURCE NAT) | ... | L3 INTERFACE OF NAT DEVICE 2 TO NAT DEVICE 1 | IP OF NAT DEVICE 1 |
| | 42 | 44-1 | 44-2 | 46-1 | 46-2 |

FIG. 9

NETWORK ADDRESS TRANSLATION (NAT) DEVICES CONFIGURED TO RESOLVE NAT STATE SYNCHRONIZATION ISSUES

BACKGROUND

A network address translation (NAT) device can provide network address translation functions between two networks such as a public network and a private network. Peer NAT devices can provide high availability and/or impart other desirable characteristics. However, differing states between peer NAT devices can lead to incorrect translations, packet drops, and other issues.

BRIEF DESCRIPTION OF THE DRAWINGS

FIGS. 5A and 5B are tables of illustrative match and action entries usable to split new address translation assignments between peer NAT devices in accordance with some embodiments.

FIG. 9 is a table of illustrative match and action entries usable to define active and standby roles between peer NAT devices when handling a particular type of traffic in accordance with some embodiments.

DETAILED DESCRIPTION

A network system may include network devices such as network address translation (NAT) devices that separate a first network such as a public network from a second network such as a private network. NAT devices may perform Internet Protocol (IP) address and/or Transport Layer (L4) port translations for network traffic to and from host devices coupled to the second network.

In particular, peer NAT devices may be coupled to each other and provide translation functions for the same host device in the second network. Each of the peer NAT devices may include a NAT table configured to store assigned IP address and L4 port translations for different network traffic flows. While the peer NAT devices should ideally store respective NAT table entries that are the same, this may not always be the case as the synchronization process between NAT devices can take a non-negligible amount of time (e.g., occur periodically). When the NAT table states on the peer NAT devices are different, this can lead to incorrect translations, packet drops, and/or other issues. To mitigate these issues, peer NAT devices can store match and action entries (e.g., on a NAT trap or trapping table), which are used to indicate how translation operations can be split between the peer NAT devices in a pre-determined and deterministic manner. The peer NAT devices may therefore coordinate their operations while not having to operate synchronously with each other which would undesirably introduce latency. These match and action entries can be used to resolve issues with duplicate new address translation assignments in full-cone translations, Transmission Control Protocol (TCP) connection set up (e.g., handling of TCP SYN-ACK packets), and ICMP traffic, just as a few illustrative examples. NAT devices configured in the manner described above may be implemented as part of a networking system such as networking system 8 in FIG. 1.

Figure 1:
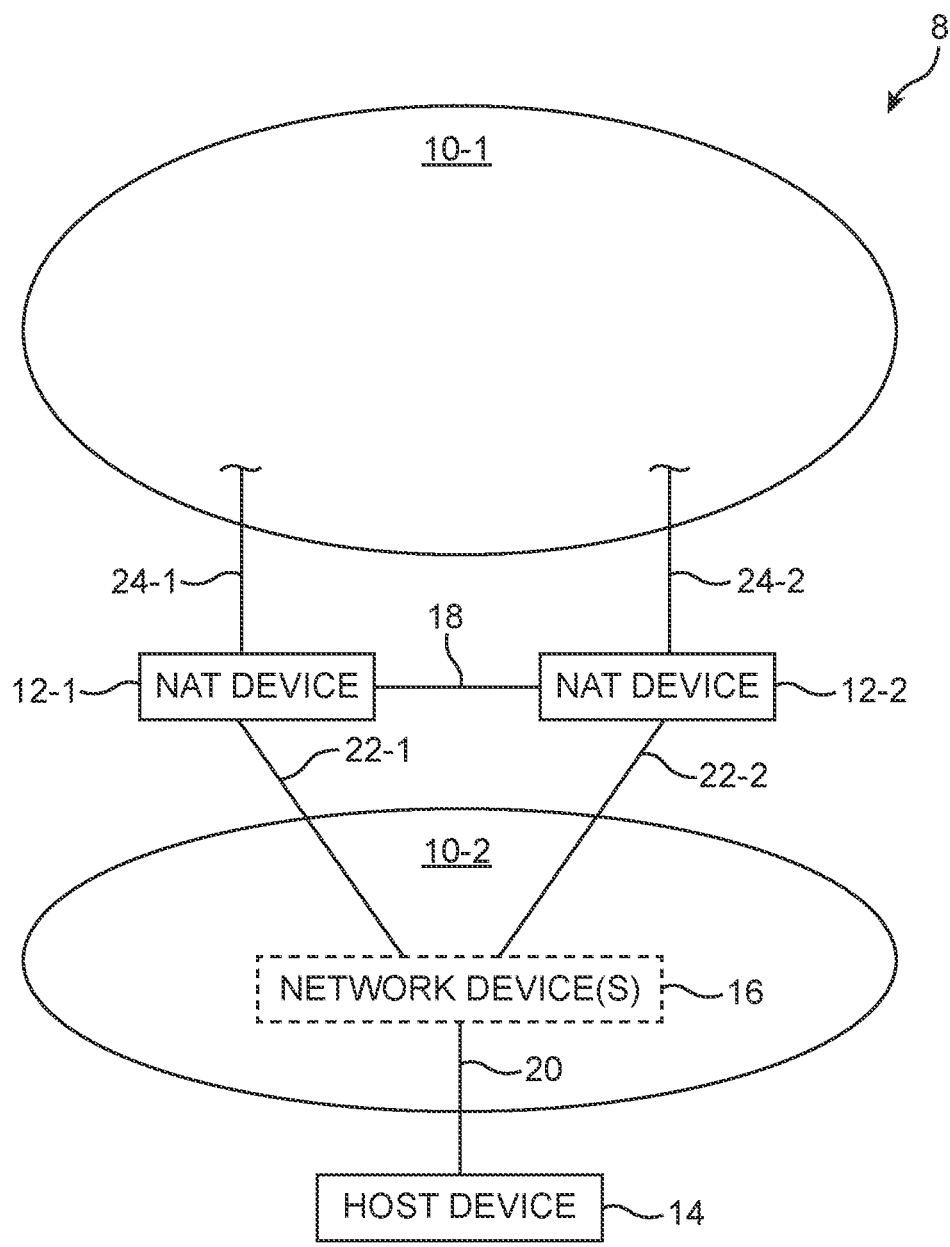
FIG. 1 is a diagram of an illustrative network system having peer NAT devices in accordance with some embodiments.

FIG. 1 is a diagram of an illustrative networking system 8. System 8 may include multiple inter-coupled network devices. The network devices may include NAT devices, switches, routers, wireless access points, bridges, hubs, repeaters, firewalls, devices serving other networking functions, devices that include a combination of these functions, or other types of network devices. Some network devices may be arranged in a first network 10-1, other network devices may be arranged in a second network 10-2, and additional network devices may be coupled between networks 10-1 and 10-2. In some instances, networks 10-1 and 10-2 may be considered to form respective portions of a single network and may therefore sometimes be referred to as first and second network portions 10-1 and 10-2.

System 8 may include network address translation (NAT) devices such as NAT devices 12-1 and 12-2. Each NAT device may be implemented as part of a switch (e.g., a NAT-enabled L3 (network layer) switch), a router (e.g., a NAT-enabled router), or another type of network device enabled to perform NAT functions. The NAT devices may perform Internet Protocol (IP) address and/or Transport Layer (L4) port translations for network traffic conveyed between host device(s) coupled to network 10-1 and host device(s) coupled to network 10-2. NAT devices 12-1 and 12-2 may be coupled between network devices in network 10-1 and network devices in network 10-2. In particular, NAT devices 12-1 and 12-2 may perform source address translations (e.g., update the source IP address in the IP header of a packet and/or update the L4 source port in the TCP or UDP (User Datagram Protocol) header of the packet), may perform destination address translations (e.g., update the destination IP address in the IP header of a packet and/or update the L4 destination port in the TCP or UDP header of the packet), and/or may perform other address translations for packets flowing between network 10-1 and network 10-2.

As shown in FIG. 1, NAT devices 12-1 and 12-2 may help convey network traffic to and from one or more host devices such as host device 14. Host device 14 may be coupled to one or more network devices 16 in network 10-2 via one or more paths 20. Through network device(s) 16, host device 14 may be coupled to NAT device 12-1 (via one or more paths 22-1 coupling network device 16 to NAT device 12-1) and coupled to NAT device 12-2 (via one or more paths 22-2 coupling the same or a different network device 16 to NAT device 12-2). NAT device 12-1 may convey network traffic between a host device coupled to network 10-1 (not shown in FIG. 1) and host device 14 via one or more paths 24-1 (and intervening network device(s) in network 10-1). NAT device 12-2 may convey network traffic between a host device coupled to network 10-1 (not shown in FIG. 1) and host device 14 via one or more paths 24-2 (and intervening network device(s) in network 10-1). NAT device 12-1 may be coupled to NAT device 12-2 via one or more paths 18 (sometimes referred to collectively as a peer link), thereby configuring NAT devices 12-1 and 12-2 as peer NAT devices having shared states and operable in parallel to perform address assignments and translations for network traffic between network 10-1 and network 10-2. Peer link(s) as referred to herein include any path that couples a (NAT) device to its peer (NAT) device based L2 and L3 connectivity and need not be dedicated paths that solely connect peer devices.

In some illustrative configurations described herein as an example, NAT devices 12-1 and 12-2 may perform source address translations (e.g., source IP address translations and/or L4 source port translations) for outgoing network traffic such as packets flowing from network 10-2 (e.g., from host device 14) to network 10-1 and may perform destination address translations (e.g., destination IP address translations and/or L4 destination port translations) for incoming network traffic flowing from network 10-1 to network 10-2 (e.g., to host device 14). In this particular example, network 10-2 may be a private network or local network, whereas network 10-1 may be a public network. If desired, NAT devices 12-1 and 12-2 may be configured in other manners with respect to other types of networks.

Figure 2:
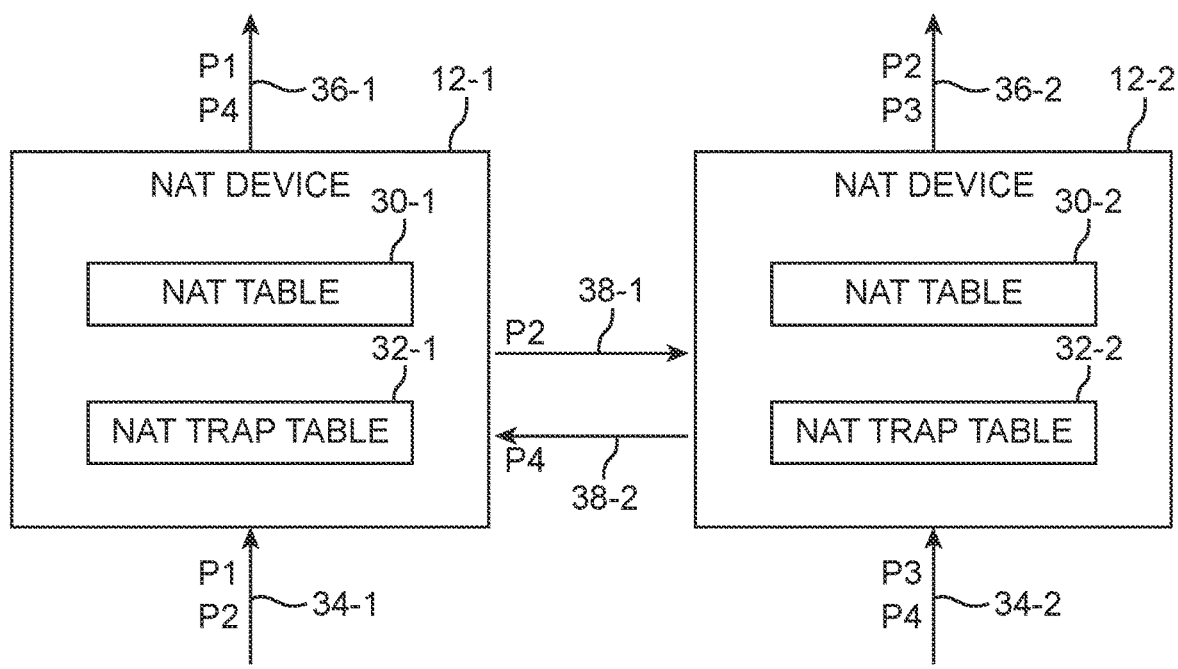
FIG. 2 is a diagram of illustrative peer NAT devices configured to perform coordinated network address translations in accordance with some embodiments.

FIG. 2 is an illustrative diagram of peer NAT devices 12-1 and 12-2 configured to perform network address assignments and translations for network traffic between networks 10-1 and 10-2. In particular, a NAT device may assign a particular network traffic flow (e.g., packets with the same source IP address and the same L4 source port number) a corresponding NAT device IP address from a pool of IP addresses useable for address translation and a corresponding NAT device port number from a pool of port numbers useable for address translation. This process may sometimes be referred to herein as address assignment and may occur only for outgoing network traffic from network 10-1 and network 10-2.

As shown in FIG. 2, each NAT device 12 may include a corresponding NAT table 30 (e.g., NAT table 30-1 in NAT device 12-1, NAT table 30-2 in NAT device 12-2, etc.). Each NAT table 30 may store network address translation assignments mapping each network flow (e.g., identifiable with the same source IP address and the same L4 source port number) to the assigned NAT device IP address and the assigned NAT device L4 port number.

As one illustrative example, a network flow from host device 14 may have a source IP address of 192.168.1.10 and a L4 source port number of 10000. A NAT device (e.g., NAT device 12-1 or NAT device 12-2) may assign a NAT device IP address of 100.100.100.1 and a NAT device L4 port number of 15000 to an initial packet in the network flow from host device 14. A NAT table on the NAT device and subsequently synchronized additional NAT tables on peer NAT devices may store the NAT device IP address of 100.100.100.1 and the NAT device L4 port number of 15000 and the corresponding source IP address of 192.168.1.10 and the L4 source port number of 10000 as one illustrative entry. The NAT device and other peer NAT devices may use this entry to translate subsequent packets in the network flow as desired and may use this entry or a corresponding destination NAT entry to translate addresses in packets in the network flow to host device 14 as well. Each NAT table may store multiple such NAT device IP address and port number assignments for corresponding network flows.

As also shown in FIG. 2, each NAT device 12 may also include a corresponding NAT trap table 32 (e.g., NAT trap table 32-1 in NAT device 12-1, NAT table 32-2 in NAT device 12-2, etc.). A NAT trap table may sometimes be referred to simply as a traffic trap table or a trap table. Each NAT device 12 may use its NAT trap table 32 to identify (then 'trap' or store) network packets that do not have a NAT translation (e.g., the translation does not exist in its NAT table 30). Processing circuitry on device 12 may provide translations to these identified, trapped network packets. The newly provided address translations (e.g., new address/port translation assignments or mappings) may then be stored onto its NAT table 30).

NAT tables such as NAT tables 30-1 and 30-2 for peer NAT devices such as NAT devices 12-1 and 12-2 may be synchronized to each other such that the same translations can be made for the same network flows even when received at different peer NAT devices. However, this synchronization process is not instantaneous. In other words, there may be a time when NAT table 30-1 has an entry (associated with a network flow) that has not been copied over to NAT table 30-2, as an example. This may be problematic when NAT device 12-2 receives a packet in this network flow whose NAT entry is absent from NAT table 30-2 (but is present in NAT table 30-1). The same type of issue may also arise when NAT table 30-2 has an entry that is absent from NAT table 30-1. These types of issues may generally be referred to herein as NAT (table) state synchronization issues and may lead to incorrect or inefficient (e.g., duplicate translations), packet drops, and other undesirable network characteristics. While translation operations at one or both NAT devices 12-1 and 12-2 may be delayed to allow sufficient time for synchronization, this may similarly be undesirable given the increase in latency.

In consideration of these illustrative issues and problems, NAT devices 12-1 and 12-2 may be configured to coordinate their translation operations in a deterministic manner while still operating independently (e.g., without needing to delay the operation of one NAT device and unnecessary introducing latency). As shown in FIG. 2, NAT devices 12-1 and 12-2 may each include a separate table (e.g., NAT trap table 32-1 for device 12-1 and NAT trap table 32-2 for device 12-2) configured to provide this deterministic behavior for new address assignment coordination and/or address translation coordination between peer NAT devices 12-1 and 12-2.

Figure 3:
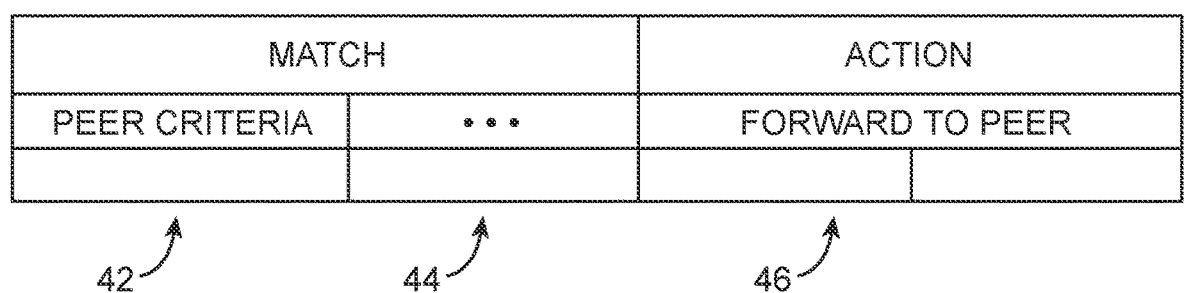
FIG. 3 is a table of an illustrative type of match and action entries usable to coordinate network address translations between peer NAT devices in accordance with some embodiments.

FIG. 3 shows an illustrative type of entry that may be included in NAT trap tables 32-1 and 32-2. In particular, an illustrative NAT trap table entry for one NAT device may include match information or criteria used to match certain traffic to be forwarded to its peer NAT device. The match information may include information 42 indicative of the type of traffic expected to be handled by its peer NAT device and/or other match information 44 usable to identify the type of traffic. Accordingly, the appropriate action 46 to be taken for the matched traffic is to forward to its peer NAT device.

Referring back to FIG. 2, NAT trap table 32-1 may store one or more entries (e.g., of the type shown in FIG. 3) that is usable to match on packets for which its peer NAT device 12-2 is expected to perform new address assignment and/or address translations. The corresponding action in response to a match is to forward the matching packet to peer NAT device 12-2. NAT trap table 32-2 may store one or more entries (e.g., of the type shown in FIG. 3) that is usable to match on packets for which its peer NAT device 12-1 is expected to perform address translations. The corresponding action in response to a match is to forward the matching packet to peer NAT device 12-1.

For any entry in NAT trap table 32-1 used to match on some of the traffic flows for an application, protocol, type of packet, etc., NAT trap table 32-2 may have a corresponding complementary entry used to match on the remainder of the traffic flows for the same application, protocol, type of packet, etc. Configured in such a manner, each traffic flow is handled (e.g., assigned a translation and/or is translated) by exactly one of NAT device 12-1 or NAT device 12-2. As described herein, a type of packet refers to any shared characteristics between packets of the type. As an example, packets of a (same) type refer to packets that have at least a same characteristic such as packets having a same protocol, a same destination IP address and/or L4 port, a same source IP address and/or L4 port, and/or other header characteristics.

To provide an illustrative scheme showing generally how packet address translations may be coordinated between NAT devices 12-1 and 12-2, FIG. 2 shows illustrative network traffic flows depicted using illustrative packets P1, P2, P3, and P4. The actual handling of different packets by NAT devices 12-1 and 12-2 may differ based on the application and/or issue trying to be resolved as further detailed in FIGS. 4-9.

As an illustrative example, packets P1 and P4 may belong to the same first network traffic flow (e.g., to or from host device 14 in FIG. 1) and packets P2 and P3 may belong to the same second network traffic flow (e.g., to or from host device 14 in FIG. 1 or another host device coupled to network 10-2). NAT device 12-1 may be configured to handle new address translation assignments and/or network address translations for the first network traffic flow, while NAT device 12-2 may be configured to handle new address assignments and/or network address translations for the second network traffic flow.

As part of the illustrative example, NAT device 12-1 may receive packet P1 at input 34-1 (e.g., coupled to path 22-1 or 24-1 in FIG. 1). Since NAT device 12-1 is responsible for handling packet P1 in the first network traffic flow, NAT device 12-1 may perform the new address assignment, if necessary, and/or perform address translation for packet P1 and output the translated packet P1 at output 36-1 (e.g., coupled to path 24-1 or 22-1 in FIG. 1).

As part of the illustrative example, NAT device 12-1 may receive packet P2 at input 34-1. Since NAT device 12-1 is not responsible for handling packet P2 in the second network traffic flow, NAT device 12-1 may forward, via peer output 38-1 (e.g., coupled to peer link 18 in FIG. 1), packet P2 to NAT device 12-2, which is responsible for handling packet P2 in the second network traffic flow. NAT device 12-2 may perform the new address assignment, if necessary, and/or perform address translation for packet P2, and output the translated packet P2 at output 36-2 (e.g., coupled to path 24-2 or 22-2 in FIG. 1).

As part of the illustrative example, NAT device 12-2 may receive packet P3 at input 34-2 (e.g., coupled to path 22-2 or 24-2 in FIG. 1). Since NAT device 12-2 is responsible for handling packet P3 in the second network traffic flow, NAT device 12-2 may perform the new address assignment, if necessary, and/or perform address translation for packet P3 and output the translated packet P3 at output 36-2.

As part of the illustrative example, NAT device 12-2 may receive packet P4 at input 34-2. Since NAT device 12-2 is not responsible for handling packet P4 in the first network traffic flow, NAT device 12-2 may forward, via peer output 38-2 (e.g., coupled to peer link 18 in FIG. 1), packet P4 to NAT device 12-1, which is responsible for handling packet P4 in the first network traffic flow. NAT device 12-1 may perform the new address assignment, if necessary, and/or perform address translation for packet P4, and output the translated packet P4 at output 36-2.

As illustrated by this example, regardless of which peer NAT device receives a particular packet, packets of different flows can be deterministically handled at one of the peer NAT devices via peer forwarding.

While the coordination and peer forwarding behavior illustrated herein is shown to be enabled by entries on NAT trap tables, this need not necessarily be the case. In some instances, because processing circuitry on NAT device may refer to (e.g., access) entries on a NAT trap table after determining that no address translation for a particular packet is present in the NAT table, it may be efficient to provide entries on the NAT trap table to specify how new address assignment operations and/or address translations can be split between NAT devices for different network flows. If desired, other mechanisms (e.g., entries in other types of tables or components in a separate module, the processing circuitry by itself, etc.) may be used instead of or in addition to NAT trap table entries to specify the desired type of coordination and/or peer forwarding behavior.

Figure 4:
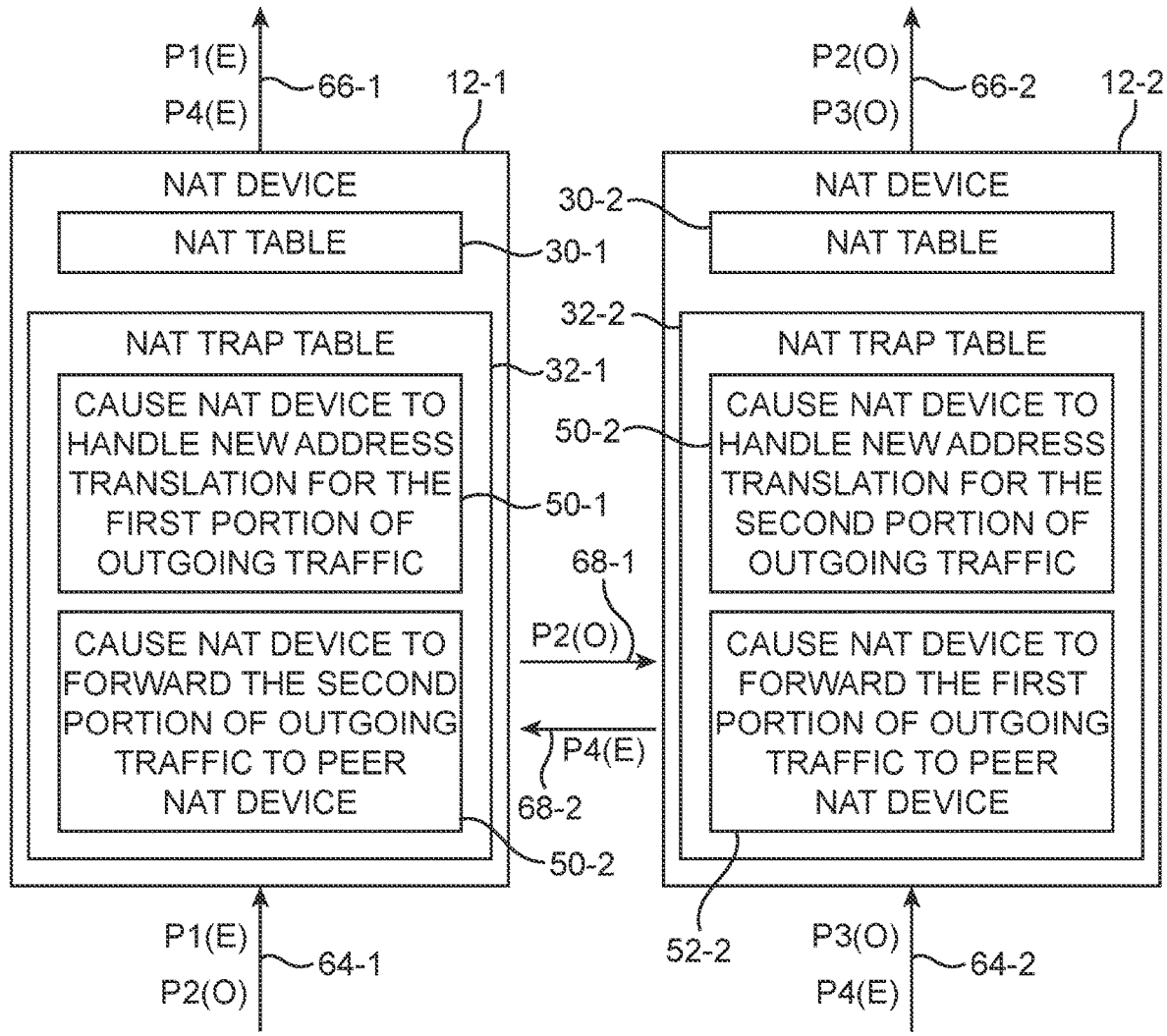
FIG. 4 is a diagram of illustrative peer NAT devices configured to coordinate new address translations in accordance with some embodiments.

FIGS. 4, 5A, and 5B illustrate how the concept as described in connection with FIGS. 2 and 3 can be applied to the assignment and creation of new address translation entries on NAT tables 30-1 and 30-2 of NAT devices 12-1 and 12-2 in a full-cone NAT implementation.

As shown in FIG. 4, NAT trap table 32-1 may include an illustrative entry that enables NAT device 12-1 exhibit characteristics 50-1 and 52-1. In particular, the illustrative entry on NAT trap table 32-1 may cause NAT device 12-1 to perform new address translation assignments for a first portion of outgoing traffic and cause NAT device 12-1 to forward a second portion of outgoing traffic to peer NAT device 12-2. Outgoing traffic may be network traffic that flows from network 10-2 to network 10-1 in FIG. 1 (e.g., from a private or local network to a public network).

As shown in FIG. 4, NAT trap table 32-2 may include an illustrative entry that enables NAT device 12-2 to exhibit characteristics 50-2 and 52-2. In particular, the illustrative entry on NAT trap table 32-2 may cause NAT device 12-2 to perform new address translation assignments for the second portion of outgoing traffic and cause NAT device 12-2 to forward the first portion of outgoing traffic to peer NAT device 12-1.

FIG. 5A shows an illustrative NAT trap table entry that may be stored on NAT trap table 32-1 to impart characteristics 50-1 and 52-1. In particular, NAT trap table 32-1 may store table entry 54-1 which has a match criterion 42 that matches on a hash value resulting from a hash function applied to the packet source IP address, the packet protocol, and the packet L4 port number being an odd value. Table entry 54-1 may also include additional match criteria 44 such as the packet egress interface being a NAT device interface with source NAT translation enabled, the protocol being UDP or TCP, the packet source IP address and L4 source port matching the access control list (ACL) used by the applicable NAT rule. Table entry 54-1 may also specify information regarding how matching packets should be forwarded to peer device 12-2 such as a forwarding interface 46-1 (e.g., an L3 interface) on NAT device 12-1 used to forward traffic to NAT device 12-2 and an IP address 46-2 of NAT device 12-2. Forwarding information 46-1 and 46-2 may be used to encapsulate the matching packets, which can then be forwarded to NAT device 12-2. As examples, any encapsulation (e.g., the inclusion of an IEEE 802.1Q tag) or any new headers (e.g., for GRE/VXLAN tunneling protocols) may be included to perform forwarding between peer NAT devices. If desired, packets may be forwarded between peer NAT devices without additional encapsulation.

FIG. 5B shows an illustrative NAT trap table entry that may be stored on NAT trap table 32-2 to impart characteristics 50-2 and 52-2. In particular, NAT trap table 32-2 may store table entry 54-2 which has a match criterion 42 that matches on a hash value resulting from a hash function applied to the packet source IP address, the packet protocol, and the packet L4 port number being an even value. Table entry 54-2 may also include additional match criteria 44 such as the packet egress interface being a NAT device interface with source NAT translation configured, the protocol being UDP or TCP, the packet source IP address and L4 source port matching the access control list (ACL) used by the applicable NAT rule. Table entry 54-2 may also specify information regarding how matching packets should be forwarded to peer device 12-1 such as a forwarding interface 46-1 on NAT device 12-2 used to forward traffic to NAT device 12-1 and an IP address 46-2 of NAT device 12-1. Forwarding information 46-1 and 46-2 may be used to encapsulate the matching packets, which can then be forwarded to NAT device 12-1. As examples, any encapsulation (e.g., the inclusion of an IEEE 802.1Q tag) or new header (e.g., for GRE/VXLAN tunneling protocols) may be included to perform forwarding between peer NAT devices. If desired, packets may be forwarded between peer NAT devices without additional encapsulation.

To provide an illustrative scheme showing how new address translations for full-cone NAT may be coordinated between NAT devices 12-1 and 12-2, FIG. 4 shows illustrative outgoing network traffic flows depicted using illustrative packets P1, P2, P3, and P4. As described herein, full-cone NAT refers to NAT with a one-to-one mapping of private (internal) IP address and L4 port to public (external) IP address and L4 port.

As an illustrative example, outgoing packets P1 and P4 may belong to the same first outgoing network traffic flow (e.g., from host device 14 in FIG. 1) and therefore have the same hash value of the source IP address, protocol, and L4 source port number that is even (E). Outgoing packets P2 and P3 may belong to the same second outgoing network traffic flow (e.g., from host device 14 in FIG. 1 or another host device coupled to network 10-2 in FIG. 1) and therefore have the same hash value of the source IP address, protocol, and L4 source port number that is odd (0).

As part of the illustrative example, NAT device 12-1 may receive packet P1 at input 64-1 (e.g., coupled to path 22-1 in FIG. 1). NAT device 12-1 may determine that no previously assigned address translation for packet P1 exists on NAT table 30-1. Furthermore, since packet P1 in the first network traffic flow has an even hash value that does not match criterion 42 in entry 54-1 stored on NAT trap table 32-1, NAT device 12-1 may assign a new address translation for the first network traffic flow, perform address translation for packet P1, store this new address translation for the first network traffic flow on NAT table 30-1, and output the translated packet P1 at output 66-1 (e.g., coupled to path 24-1 in FIG. 1).

As part of the illustrative example, NAT device 12-2 may receive packet P4 at input 64-2 (e.g., coupled to path 22-2 in FIG. 1). NAT device 12-2 may determine that no corresponding translation for packet P4 exists on NAT table 30-2. Since packet P4 in the first network traffic flow has an even hash value that matches on criterion 42 (and additional criteria 44 are matched) in entry 54-2 stored on NAT trap table 32-2, NAT device 12-2 may tag or encapsulate packet P4 based on information 46-1 and 46-2 and may forward the tagged or encapsulated packet P4 to NAT device 12-1 via peer output 68-2 (e.g., coupled to peer link 18 in FIG. 1). NAT device 12-1 may receive packet P4, perform address translation for packet P4 (e.g., based on the address translation on NAT table 30-1 stored when first translating packet P1 belonging to the same network traffic flow), and output the translated packet P4 at output 66-1. If no corresponding translation existed on NAT table 30-1 (e.g., packet P1 was received after packet P4), NAT device 12-1 may store this new address translation (when translating packet P4) for the first network traffic flow on NAT table 30-1. Configured in this manner, NAT device 12-1 can perform the new address translation assignment for the first network traffic flow whether caused by a packet (P1) received directly at NAT device 12-1 or a packet (P4) received via forwarding from NAT device 12-2 and store this new address translation assignment for the first network traffic flow on NAT table 30-1.

As part of the illustrative example, NAT device 12-1 may receive packet P2 at input 64-1. NAT device 12-1 may determine that no corresponding translation for packet P2 exists on NAT table 30-1. Since packet P2 in the second network traffic flow has an odd hash value that matches on criterion 42 (and additional criteria 44 are matched) in entry 54-1 stored on NAT trap table 32-1, NAT device 12-1 may tag or encapsulate packet P2 based on information 46-1 and 46-2 and may forward the tagged or encapsulated packet P2 to NAT device 12-2 via peer output 68-1 (e.g., coupled to peer link 18 in FIG. 1). NAT device 12-2 may receive packet P2 and determine that no corresponding translation for packet P2 exists on NAT table 30-2. Since packet P2 in the second network traffic flow has an odd hash value that does not match criterion 42 in entry 54-2 stored on NAT trap table 32-2, NAT device 12-2 may assign a new address translation for the second network traffic flow, perform address translation for packet P2, store this new address translation for the second network traffic flow on NAT table 30-2, and output the translated packet P2 at output 66-2 (e.g., coupled to path 24-2 in FIG. 1).

As part of the illustrative example, NAT device 12-2 may receive packet P3 at input 64-2. NAT device 12-2 may determine that a corresponding translation for packet P3 does exist on NAT table 30-2 (based on the address translation on NAT table 30-2 stored when first translating packet P2 belonging to the same network traffic flow). NAT device 12-2 may perform address translation for packet P3 and output the translated packet P3 at output 66-2. If no corresponding translation existed on NAT table 30-2 (e.g., packet P2 was received after packet P3), NAT device 12-2 may store this new address translation (when translating packet P3) for the second network traffic flow on NAT table 30-2. Configured in this manner, NAT device 12-2 can perform the new address translation assignment for the second network traffic flow whether caused by a packet (P3) received directly at NAT device 12-2 or a packet (P2) received via forwarding from NAT device 12-1 and store this new address translation assignment for the second network traffic flow on NAT table 30-2.

While in the example described above peer forwarding occurs for packets P2 and P4, this is merely illustrative. In another scenario where NAT table 30-1 already includes the appropriate address translations for packet P4 (e.g., because NAT tables 30-1 and 30-2 have been synchronized to have the same entries), NAT device 12-1 may simply perform the translation for packet P2 without need to perform peer forwarding. In another scenario where NAT table 30-2 already includes the appropriate address translations for packet P2, NAT device 12-2 may simply perform the translation for packet P2 without need to perform peer forwarding.

As illustrated by FIGS. 4, 5A, and 5B, peer NAT device 12-1 may be configured to handle assignment of a new address translation for a first set of outgoing packets (e.g., from private network to public network) based on a hash value (of packet source IP address, Protocol, and L4 source port number) being even, while peer NAT device 12-2 may be configured to handle assignment of a new address translation for a second (complementary) set of outgoing traffic based on a hash value (of packet source IP address, Protocol, L4 source port number) being odd. If any of the second set of outgoing traffic is received at NAT device 12-1, it is forwarded to the NAT device 12-2 if there is no match in NAT table 30-1 in NAT device 12-1 (e.g., either because of syncing lag or because neither NAT devices have a translation). NAT device 12-2 may perform the analogous forwarding operation to NAT device 12-1 if any of the first set of outgoing traffic is received. Configured in this manner, exactly one of NAT device 12-1 or 12-2 is responsible to assign new translations for each network flow, thereby eliminating any issues with duplicate translations (e.g., both NAT device 12-1 and 12-2 each assigning a different translation to the same network flow).

The hash value of packet source IP address, Protocol, and L4 source port number being even or odd may be desirably used as the complementary criteria 42 in NAT trap table entries 54-1 and 54-2 because this enables a deterministic, yet random and balanced split of new address assignment and translation operations between peer devices 12-1 and 12-2. However, if desired, other complementary criteria may be used in place of the hash value being even or odd as criteria 42 in NAT trap table entries 54-1 and 54-2.

Figure 6:
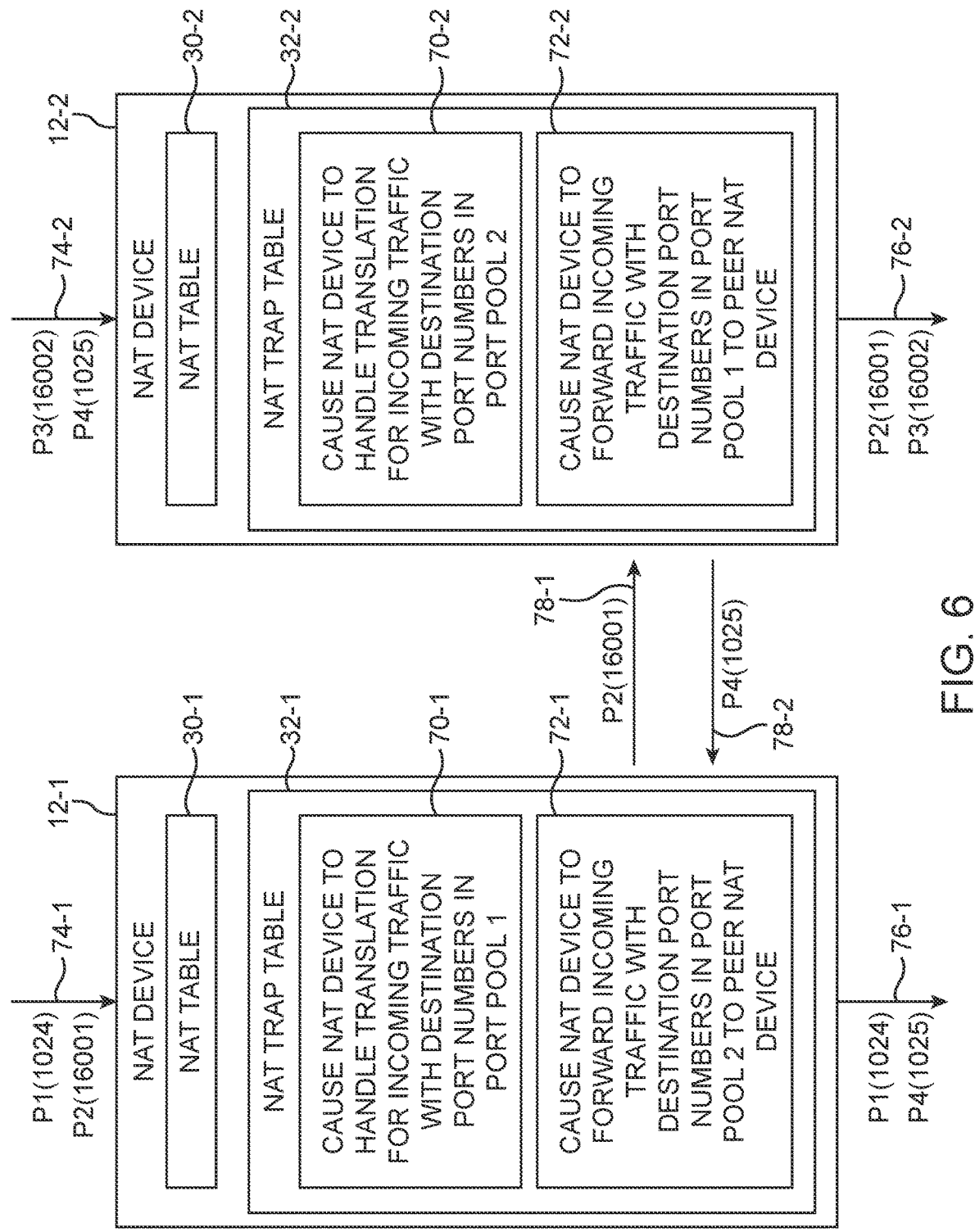
FIG. 6 is a diagram of illustrative peer NAT devices configured to coordinate incoming traffic address translations in accordance with some embodiments.
Figure 7A:
FIGS. 7A and 7B are tables of illustrative match and action entries usable to split incoming traffic address translation operations between peer NAT devices in accordance with some embodiments.
Figure 7B:

FIGS. 6, 7A, and 7B illustrate how the concept as described in connection with FIGS. 2 and 3 can be applied to the destination network address translations using NAT tables of NAT devices 12-1 and 12-2 when receiving TCP SYN-ACK packets as part of establishing a TCP connection. The establishment of the TCP connection may involve the client such as host device 14 in FIG. 1 first sending a packet with a sequence number and an asserted SYN flag bit (a TCP SYN packet), the server responding with a packet having an asserted SYN flag bit and an asserted ACK flag bit (a TCP SYN-ACK packet), and finally, the client sending a packet with an asserted ACK flag bit (a TCP ACK packet).

Consider an example in which NAT device 12-1 receives an outgoing TCP SYN packet (e.g., from host device 14 in FIG. 1). NAT device 12-1 may assign a new address translation such as a NAT device IP address and a NAT device port number to the outgoing TCP SYN packet (e.g., the network flow associated with the outgoing TCP SYN packet). This newly assigned address translation may be stored on NAT table 30-1. The translated TCP SYN packet may be sent out to the receiving host device (e.g., coupled to network 10-1). In some instances, NAT device 12-2 may receive the TCP SYN-ACK packet (responsive to the TCP SYN packet sent out by NAT device 12-1). This may be problematic if the newly assigned address translation stored on NAT table 30-1 has not propagated to NAT table 30-2 in device 12-2 as the TCP SYN-ACK packet received NAT device 12-2 may be dropped due to a lack of address translation on NAT table 30-2 in device 12-2 for the TCP SYN-ACK packet. NAT devices 12-1 and 12-2 may be configured as shown in FIG. 6 to mitigate these types of issues.

As shown in FIG. 6, NAT trap table 32-1 may include an illustrative entry that enables NAT device 12-1 to exhibit characteristics 70-1 and 72-1. In particular, the illustrative entry on NAT trap table 32-1 may cause NAT device 12-1 to perform destination address translations for incoming traffic with L4 destination port numbers within the range or pool of port numbers (Port Pool 1) originally allocated by NAT device 12-1 as part of new address translation assignments and cause NAT device 12-1 to forward incoming traffic with L4 destination port numbers outside of the range or pool of port numbers originally allocated by NAT device 12-1 to peer NAT device 12-2. Incoming traffic may be network traffic that flows from network 10-1 to network 10-2 in FIG. 1 (e.g., from a public network to a private or local network).

As shown in FIG. 6, NAT trap table 32-2 may include an illustrative entry that enables NAT device 12-2 to exhibit characteristics 70-2 and 72-2. In particular, the illustrative entry on NAT trap table 32-2 may cause NAT device 12-2 to perform destination address translations for incoming traffic with L4 destination port numbers within the range or pool of port numbers (Port Pool 2) originally allocated by NAT device 12-2 as part of new address translation assignments and cause NAT device 12-2 to forward incoming traffic with L4 destination port numbers outside of the range or pool of port numbers originally allocated by NAT device 12-2 to peer NAT device 12-1.

Configuring NAT devices 12-1 and 12-2 to exhibit characteristics 70-1, 70-2, 72-1, and 72-2 may help ensure that an incoming TCP SYN-ACK packet received on one of the NAT devices 12-1 or 12-2 is not dropped when the appropriate address translations exists on the other one of the NAT devices 12-2 or 12-1 (resulting from a previously outgoing TCP SYN packet).

FIG. 7A shows an illustrative NAT trap table entry that may be stored on NAT trap table 32-1 to impart characteristics 70-1 and 72-1. In particular, NAT trap table 32-1 may store table entry 82-1 which has a match criterion 42 that matches on an L4 destination port number of the incoming packet being in port pool 2 (e.g., the pool of NAT device port numbers assigned by NAT device 12-2 such as port numbers 16001-32000). Table entry 82-1 may also include additional match criteria 44 such as the packet ingress interface being a NAT device interface with source NAT translation configured, the protocol being UDP or TCP, the packet destination IP address being within a NAT device IP address pool (e.g., being one of the assigned NAT device IP addresses). Table entry 82-1 may also specify information regarding how matching packets should be forwarded to peer device 12-2 such as a forwarding interface 46-1 (e.g., an L3 interface) on NAT device 12-1 used to forward traffic to NAT device 12-2 and an IP address 46-2 of NAT device 12-2. Forwarding information 46-1 and 46-2 may be used to encapsulate the matching packets, which can then be forwarded to NAT device 12-2. As examples, any encapsulation (e.g., the inclusion of an IEEE 802.1Q tag) or any new headers (e.g., for GRE/VXLAN tunneling protocols) may be included to perform forwarding between peer NAT devices. If desired, packets may be forwarded between peer NAT devices without additional encapsulation.

FIG. 7B shows an illustrative NAT trap table entry that may be stored on NAT trap table 32-2 to impart characteristics 70-2 and 72-2. In particular, NAT trap table 32-2 may store table entry 82-2 which has a match criterion 42 that matches on an L4 destination port number of the incoming packet being in port pool 1 (e.g., the pool of NAT device port numbers assigned by NAT device 12-1 such as port numbers 1024-16000). Table entry 82-2 may also include additional match criteria 44 such as the packet ingress interface being a NAT device interface with source NAT translation configured, the protocol being UDP or TCP, the packet destination IP address being within a NAT device IP address pool (e.g., being one of the assigned NAT device IP addresses). Table entry 82-2 may also specify information regarding how matching packets should be forwarded to peer device 12-1 such as a forwarding interface 46-1 (e.g., an L3 interface) on NAT device 12-2 used to forward traffic to NAT device 12-1 and an IP address 46-2 of NAT device 12-1. Forwarding information 46-1 and 46-2 may be used to encapsulate the matching packets, which can then be forwarded to NAT device 12-1. As examples, any encapsulation (e.g., the inclusion of an IEEE 802.1Q tag) or any new headers (e.g., for GRE/VXLAN tunneling protocols) may be included to perform forwarding between peer NAT devices. If desired, packets may be forwarded between peer NAT devices without additional encapsulation.

To provide an illustrative scheme showing how destination address translations for TCP SYN-ACK packets may be coordinated between NAT devices 12-1 and 12-2, FIG. 6 shows illustrative incoming TCP SYN-ACK packets P1, P2, P3, and P4.

As an illustrative example, incoming TCP SYN-ACK packets P1, P2, P3, and P4 may each belong to a different network traffic flow (e.g., used to establish a different TCP connection for host device 12 and/or other host devices coupled to network 10-2). Accordingly, packet P1 may have an L4 destination port number of 1024, packet P2 may have an L4 destination port number of 16001, packet P3 may have an L4 destination port number of 16002, and packet P4 may have an L4 destination port number of 1025. In this example, NAT device 10-1 may be configured to allocate NAT device port numbers in range 1024-16000 when assigning new network address translations, while NAT device 10-2 may be configured to allocate NAT device port numbers in range 16001-32000 when assigning new network address translations.

As part of the illustrative example, NAT device 12-1 may receive packet P1 at input 74-1 (e.g., coupled to path 24-1 in FIG. 1). NAT device 12-1 may determine that an appropriate address translation for packet P1 exists on NAT table 30-1 because NAT device 12-1 is responsible for assigning the address translation containing port number 1024, which is the destination port number of packet P1, since port number 1024 is in port pool 1 subject to allocation by NAT device 12-1. NAT device 12-1 may perform destination address translation for packet P1 and output the translated packet P1 at output 76-1 (e.g., coupled to path 22-1 in FIG. 1).

As part of the illustrative example, NAT device 12-2 may receive packet P4 at input 74-2 (e.g., coupled to path 24-2 in FIG. 1). NAT device 12-2 may determine that no corresponding translation for packet P4 exists on NAT table 30-2. Since packet P4 has a destination port number that matches on criterion 42 (and additional criteria 44 are matched) in entry 82-2 stored on NAT trap table 32-2, NAT device 12-2 may tag or encapsulate packet P4 based on information 46-1 and 46-2 and may forward the tagged or encapsulated packet P4 to NAT device 12-1 via peer output 78-2 (e.g., coupled to peer link 18 in FIG. 1). NAT device 12-1 may receive packet P4, perform destination address translation for packet P4 (e.g., based on the address translation on NAT table 30-1 stored when first translating the corresponding TCP SYN packet for the same TCP connection), and output the translated packet P4 at output 76-1. Configured in this manner, NAT device 12-1 can perform the destination address (e.g., IP address and L4 port) translation for the subset of TCP SYN-ACK packets, for which the corresponding TCP SYN packets were initially translated by NAT device 12-1, regardless of whether one or more of these TCP SYN-ACK packets is received directly at NAT device 12-1 or via peer forwarding from NAT device 12-2. Accordingly, this subset of TCP SYN-ACK packets will not be dropped even if these packets are received at NAT device 12-2 and the appropriate address translations have not been propagated from NAT table 30-1 to NAT table 30-2.

As part of the illustrative example, NAT device 12-2 may receive packet P3 at input 74-2. NAT device 12-2 may determine that an appropriate address translation for packet P3 exists on NAT table 30-2 because NAT device 12-2 is responsible for assigning the address translation containing port number 16002, which is the destination port number of packet P3, since port number 16002 is in port pool 2 subject to allocation by NAT device 12-2. NAT device 12-2 may perform destination address translation for packet P3 and output the translated packet P3 at output 76-2 (e.g., coupled to path 22-2 in FIG. 1).

As part of the illustrative example, NAT device 12-1 may receive packet P2 at input 74-1. NAT device 12-1 may determine that no corresponding translation for packet P2 exists on NAT table 30-1. Since packet P2 has a destination port number that matches on criterion 42 (and additional criteria 44 are matched) in entry 82-1 stored on NAT trap table 32-1, NAT device 12-1 may tag or encapsulate packet P2 based on information 46-1 and 46-2 and may forward the tagged or encapsulated packet P2 to NAT device 12-2 via peer output 78-1 (e.g., coupled to peer link 18 in FIG. 1). NAT device 12-2 may receive packet P2, perform destination address translation for packet P2 (e.g., based on the address translation on NAT table 30-2 stored when first translating the corresponding TCP SYN packet for the same TCP connection), and output the translated packet P2 at output 76-2. Configured in this manner, NAT device 12-2 can perform the destination address (e.g., IP address and L4 port) translation for the subset of TCP SYN-ACK packets, for which the corresponding TCP SYN packets were initially translated by NAT device 12-2, regardless of whether one or more of these TCP SYN-ACK packets is received directly at NAT device 12-2 or via peer forwarding from NAT device 12-1. Accordingly, this subset of TCP SYN-ACK packets will not be dropped even if these packets are received at NAT device 12-1 and the appropriate address translations have not been propagated from NAT table 30-2 to NAT table 30-1.

The described port pool ranges of 1024-16000 assigned by NAT device 12-1 and of 16001-32000 assigned by NAT device 12-2 are merely illustrative. If desired, other ranges and/or even other criteria may be used insofar as each NAT device is configured to deterministically perform address translations for both the TCP SYN packet and the TCP SYN-ACK packet for establishing the same TCP connection. If desired, UDP packets may also be forwarded and translated in the same manner (e.g., packets P1, P2, P3, and P4 may be UDP packets).

Figure 8:
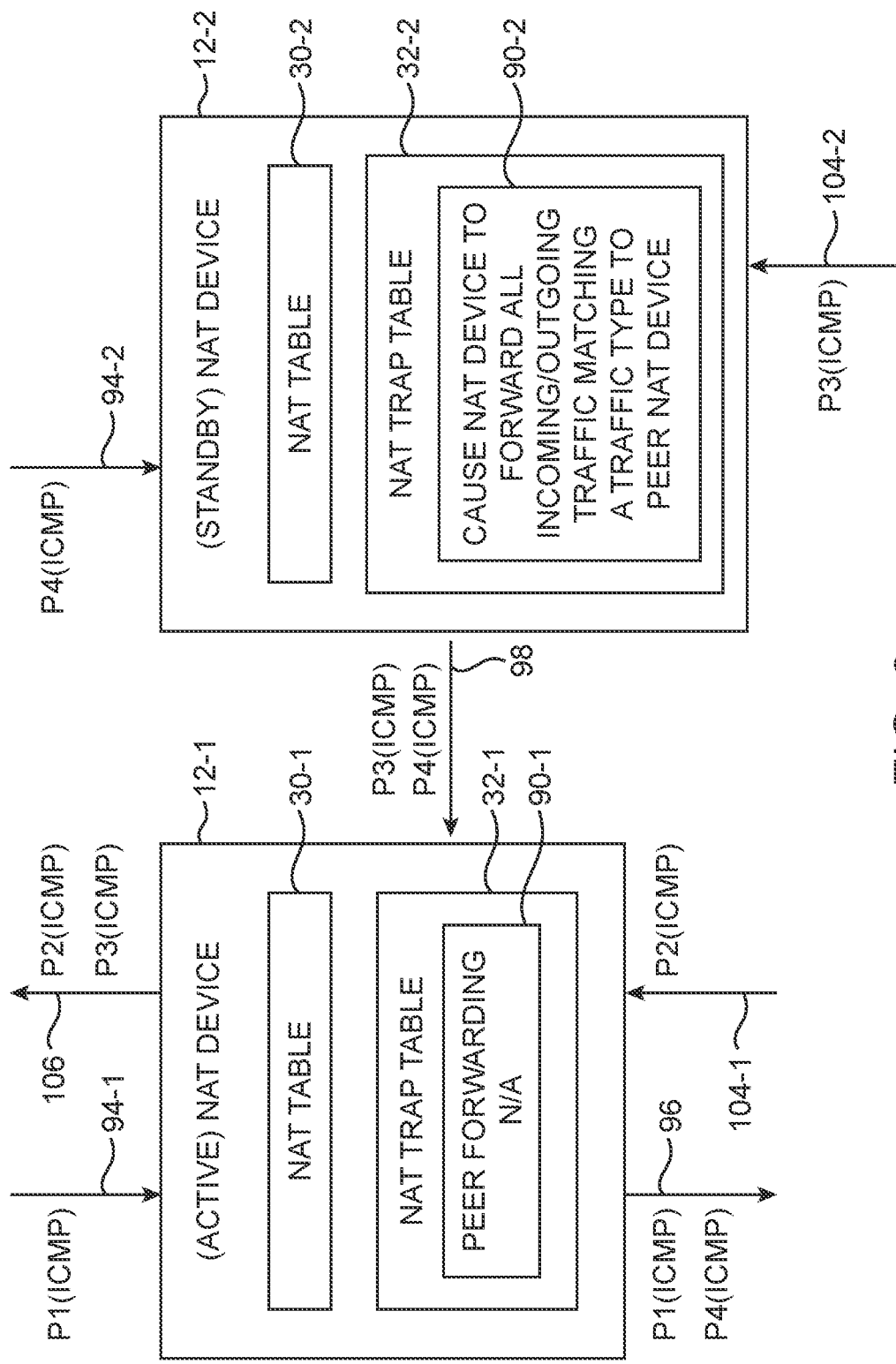
FIG. 8 is a diagram of illustrative peer NAT devices configured to coordinate address translations for a particular type of traffic in accordance with some embodiments.

FIGS. 8 and 9 illustrate how the concept as described in connection with FIGS. 2 and 3 can be applied to the ICMP (Internet Control Message Protocol) traffic such as incoming and outgoing ICMP packets when handled by peer NAT devices 12-1 and 12-2. The ICMP packets described herein may be IP packets with ICMP messages.

In particular, the ICMP messages may involve the conveyance of request messages and reply messages responsive to the request messages (e.g., an echo request message and an echo reply message). Consider an example in which NAT device 12-1 receives a querying ICMP packet with an echo request (e.g., from network 10-1 or 10-2 in FIG. 1) but NAT device 12-2 receives a replying ICMP packet with an echo reply (e.g., from network 10-2 or 10-1 in FIG. 1) shortly thereafter. In this example, because ICMP connection tracking translation entries may not be synchronized between peer devices 12-1 and 12-2, device 12-2 may mishandle the translation of the replying ICMP packet (e.g., drop the replying ICMP packet due to a lack of address translation on NAT table 30-2). NAT devices 12-1 and 12-2 may be configured as shown in FIG. 8 to mitigate these types of issues.

As shown in FIG. 8, NAT trap table 32-1 may be configured (e.g., due to a lack of peer device forwarding entries for ICMP traffic) to enable NAT device 12-1 exhibit characteristics 90-1. In particular, the lack of peer device forwarding entries for ICMP traffic on NAT trap table 32-1 may cause NAT device 12-1 to perform address translations for all of its received ICMP traffic, thereby serving as the active NAT device among all peer NAT devices.

NAT trap table 32-2 may be configured (e.g., with multiple peer device forwarding entries for ICMP) to enable NAT device 12-2 exhibit characteristics 90-2. In particular, the multiple peer device forwarding entries for ICMP traffic on NAT trap table 32-2 may cause NAT device 12-2 to forward all of its received (incoming and outgoing) ICMP traffic to its peer device 30-1, thereby serving as a standby NAT device among all peer NAT devices.

Configuring NAT devices 12-1 and 12-2 to exhibit characteristics 90-1 and 90-2 may help ensure that ICMP traffic received on one of the NAT devices 12-1 or 12-2 is not dropped when the appropriate address translations exist on the other one of the NAT devices 12-2 or 12-1.

FIG. 9 shows illustrative NAT trap table entries that may be stored on NAT trap table 32-2 of standby NAT device 12-2 to impart characteristic 90-2. In particular, NAT trap table 32-2 may store table entry 100 which has a match criterion 42 that matches on the protocol being ICMP. Table entry 100 may also include additional match criteria such as the packet ingress interface being a NAT device interface with source NAT translation configured (e.g., criterion 44-1 indicating incoming traffic) and other criteria 44-2, if desired. Table entry 100 may also specify information regarding how matching packets should be forwarded to peer device 12-1 such as a forwarding interface 46-1 (e.g., an L3 interface) on NAT device 12-2 used to forward traffic to NAT device 12-1 and an IP address 46-2 of NAT device 12-1. Forwarding information 46-1 and 46-2 may be used to encapsulate the matching packets, which can then be forwarded to NAT device 12-1. As examples, any encapsulation (e.g., the inclusion of an IEEE 802.1Q tag) or any new headers (e.g., for GRE/VXLAN tunneling protocols) may be included to perform forwarding between peer NAT devices. If desired, packets may be forwarded between peer NAT devices without additional encapsulation.

NAT trap table 32-2 may store table entry 102 which has a match criterion 42 that matches on the protocol being ICMP. Table entry 102 may also include additional match criteria such as the packet egress interface being a NAT device interface with source NAT translation configured (e.g., criterion 44-1 indicating outgoing traffic) and other criteria 44-2, if desired. Table entry 102 may also specify information regarding how matching packets should be forwarded to peer device 12-1 such as a forwarding interface 46-1 (e.g., an L3 interface) on NAT device 12-2 used to forward traffic to NAT device 12-1 and an IP address 46-2 of NAT device 12-1. Forwarding information 46-1 and 46-2 may be used to encapsulate the matching packets, which can then be forwarded to NAT device 12-1. As examples, any encapsulation (e.g., the inclusion of an IEEE 802.1Q tag) or any new headers (e.g., for GRE/VXLAN tunneling protocols) may be included to perform forwarding between peer NAT devices. If desired, packets may be forwarded between peer NAT devices without additional encapsulation.

To provide an illustrative scheme showing how address translations for ICMP traffic may be coordinated between NAT devices 12-1 and 12-2, FIG. 8 shows illustrative ICMP packets P1, P2, P3, and P4.

As an illustrative example, packet P2 may include another querying ICMP message, and packet P4 may include a replying ICMP message responsive to the querying ICMP message of packet P2. Separately, packet P3 may include a querying ICMP message such as an echo request, and packet P1 may include a replying ICMP message such as an echo reply responsive to the querying ICMP message of packet P3.

As part of the illustrative example, NAT device 12-1 may receive packet P2 at input 104-1 (e.g., coupled to path 22-1 in FIG. 1). NAT device 12-1 may determine that no appropriate address translation for packet P2 exists on NAT table 30-1, but may provide a new translation for packet P2 and store the new translation in table 30-1 because NAT device 12-1 is responsible for assigning and translating ICMP traffic. NAT device 12-1 may then output the translated packet P2 at output 106 (e.g., coupled to path 24-1 in FIG. 1).

As part of the illustrative example, NAT device 12-2 may receive packet P4 at input 94-2 (e.g., coupled to path 24-2 in FIG. 1). NAT device 12-2 may determine that no corresponding translation for packet P4 exists on NAT table 30-2. Since packet P4 has a protocol and an ingress interface that match on criteria 42 and 44-1 (and additional criteria 44-2 are matched) in entry 100 stored on NAT trap table 32-2, NAT device 12-2 may tag or encapsulate packet P4 based on information 46-1 and 46-2 and may forward the tagged or encapsulated packet P4 to NAT device 12-1 via peer output 98 (e.g., coupled to peer link 18 in FIG. 1). NAT device 12-1 may receive packet P4, perform address translation for packet P4 (e.g., based on the translation on NAT table 30-1 stored when first translating the packet P2), and output the translated packet P4 at output 96 (e.g., coupled to path 22-1).

As part of the illustrative example, NAT device 12-2 may receive packet P3 at input 104-2 (e.g., coupled to path 22-2 in FIG. 1). NAT device 12-2 may determine that no appropriate address translation for packet P3 exists on NAT table 30-2. Since packet P3 has a protocol and an egress interface that match on criteria 42 and 44-1 (and additional criteria 44-2 are matched) in entry 102 stored on NAT trap table 32-2, NAT device 12-2 may tag or encapsulate packet P3 based on information 46-1 and 46-2 and may forward the tagged or encapsulated packet P3 to NAT device 12-1 via peer output 98. NAT device 12-1 may receive packet P3, provide a new translation for packet P3, and store the new translation in table 30-1 because NAT device 12-1 is responsible for assigning and translating ICMP traffic. NAT device 12-1 may then output the translated packet P3 at output 106.

As part of the illustrative example, NAT device 12-1 may receive packet P1 at input 94-1 (e.g., coupled to path 24-1 in FIG. 1). NAT device 12-1 may determine that a corresponding translation for packet P1 (e.g., based on the translation stored when first translating the packet P3) exists on NAT table 30-1. NAT device 12-1 may perform address translation for packet P1 and output the translated packet P1 at output 96.

Configured in this manner, NAT device 12-1 can perform the address translation for both the querying and the replying messages in corresponding pairs of ICMP messages, regardless of whether one or more of these ICMP packets is received directly at NAT device 12-1 or via peer forwarding from NAT device 12-2. Accordingly, ICMP packets will not be dropped even if these packets are received at NAT device 12-2 and the appropriate address translations do not exist on NAT table 30-2.

Figure 10:
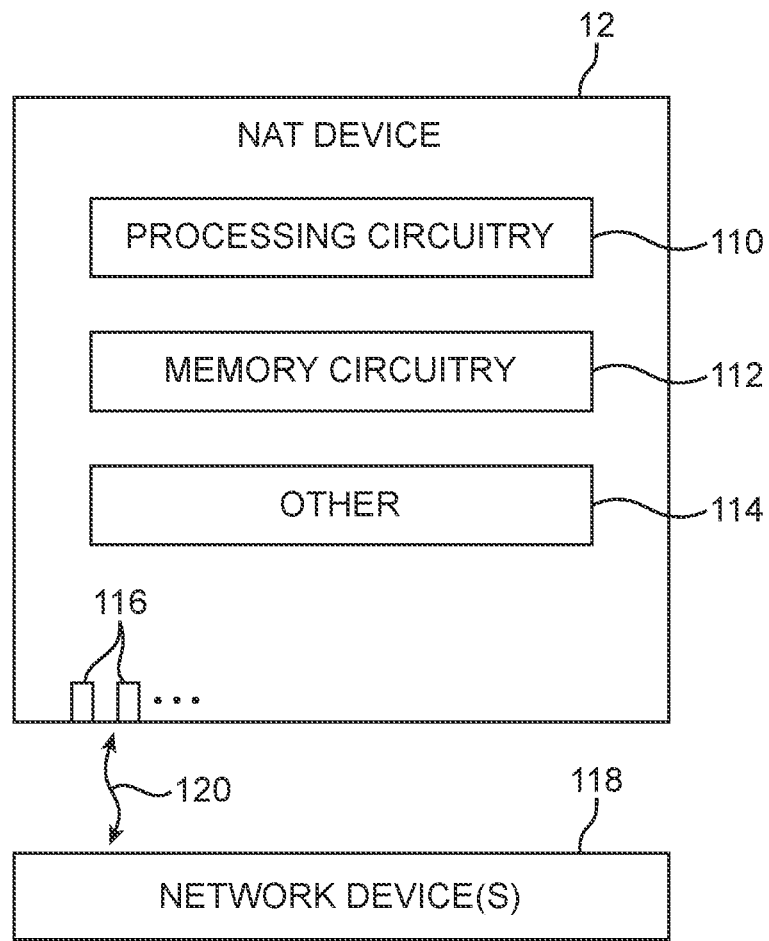
FIG. 10 is a diagram of an illustrative NAT device in accordance with some embodiments.

FIG. 10 is a block diagram of an illustrative NAT device 12 such as a switch, router, or other network device implementing network address translation functionalities (e.g., IP address translation and/or L4 port translation). One or both of NAT devices 12-1 and 12-2 as described in connection with FIGS. 1-9 may be implemented in the manner as described in connection with device 12 in FIG. 10. As shown in FIG. 10, NAT device 12 may include processing circuitry 110, memory circuitry 112, and other components 114 such as input-output interfaces 116.

In particular, processing circuitry 110 may include one or more processors or processing units based on one or more microprocessors, graphics processing units (GPUs), general-purpose processors, microcontrollers, digital signal processors, application specific integrated circuits (ASICs), application specific system processors (ASSPs), programmable logic devices such as field-programmable gate arrays (FPGAs), a combination of these processors, or other types of processors.

Memory circuitry 112 may include non-transitory (tangible) computer readable storage media that stores the operating system and/or any software code, sometimes referred to as program instructions, software, data, instructions, or code. In particular, memory circuitry 112 may include nonvolatile memory (e.g., flash memory, solid-state storage, electrically-programmable read-only memory configured to form a solid-state drive, and/or other types of nonvolatile memory), volatile memory (e.g., static or dynamic random-access memory, cache memory and/or other types of volatile memory), hard disk drive storage, and/or other memory or data storage circuitry.

The operations described herein relating to the operation of one or more NAT devices 12 (e.g., NAT Devices 12-1 and 12-2) and/or other relevant operations may be stored as (software) instructions on one or more non-transitory computer-readable storage media (e.g., memory circuitry 112) in each NAT device 12. The corresponding processing circuitry (e.g., processing circuitry 110) in each NAT device 12 for these one or more non-transitory computer-readable storage media may process the respective instructions to perform the corresponding NAT device operations. Processing circuitry 110 and memory circuitry 112, collectively, may sometimes be referred to herein as the control circuitry of NAT device 12 because the two are often collectively used to control one or more components of NAT device 12 to perform these operations (e.g., by sending and/or receiving requests, control signals, and data in response to performing calculations, comparisons, and other operations).

In general, when a NAT device is described herein to use its NAT table and/or NAT trap table to perform certain operations (e.g., matching, forwarding, translating, etc.), processing circuitry 110 may be configured to operate on its NAT table and/or NAT trap table to perform these functions (e.g., by performing calculations and comparisons, by controlling other components such as input-output interfaces to forward traffic, etc.). NAT tables 30 and NAT trap tables 32 may be stored in any form (e.g., any suitable data structure and not necessarily in tabular form) on memory circuitry 112.

NAT device 12 may include other components 112 such as one or more input-output interfaces 116. One or more input-output interfaces 116 may include communication interface components such as a Bluetooth® interface, a Wi-Fi® interface, an Ethernet interface such as one or more Ethernet ports, an optical interface, and/or other networking interfaces for connecting NAT device 14 (via link 120) to the Internet, a local area network, a wide area network, a mobile network, other types of networks, and/or to other network device(s) 118 such as one or more peer NAT devices, switches, routers, modems, network controllers, peripheral devices, and/or other electronic components. Interfaces 116 may also include, if desired, power ports through which power is supplied to NAT device 12. If desired, other components 112 on NAT device 12 may include other input-output devices such as devices that provide output to a user such as a display device (e.g., one or more status lights) and/or devices that gather input from a user such as one or more buttons. Each component within NAT device 12 may be interconnected to one or other components (e.g., to the control circuitry in access point NAT device 12) via one or more paths (e.g., one or more data or system buses) that enable the reception and transmission of control signals and/or other data.

The system formed by NAT device 12, a peer NAT device 12, and/or other network devices 118 may be part of a digital system or a hybrid system that includes both digital and analog subsystems. The system may be used in a wide variety of applications as part of a larger computing system, which may include but is not limited to: a datacenter, a computer networking system, a data networking system, a digital signal processing system, a graphics processing system, a video processing system, a computer vision processing system, a cellular base station, a virtual reality or augmented reality system, a network functions virtualization platform, an artificial neural network, an autonomous driving system, a combination of at least some of these systems, and/or other suitable types of computing systems.

Figure 11:
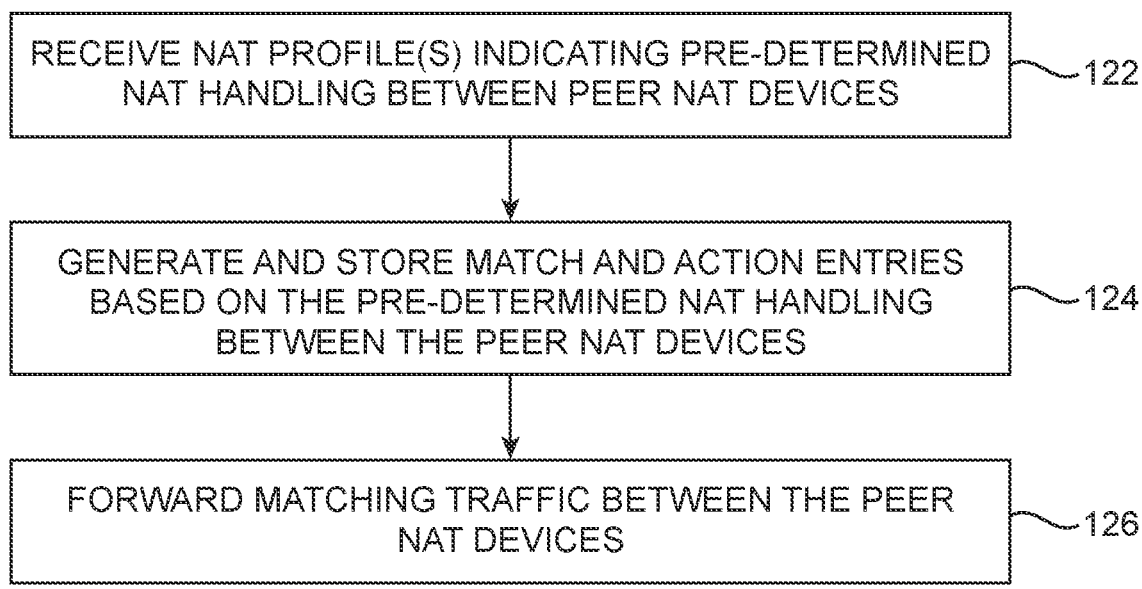
FIG. 11 is a flowchart of illustrative operations for coordinating network address translations between peer NAT devices in accordance with some embodiments.

FIG. 11 is a flowchart of illustrative operations for coordinating NAT device operation between peer NAT devices. The operations described in connection with FIG. 11 may be performed by one or more sets of peer NAT devices such as NAT devices 12-1 and 12-2 in network system 8 (FIG. 1).

As shown in FIG. 11, at block 122, the control circuitry (e.g., processing circuitry 110 when processing instructions stored on non-transitory computer-readable storage media on memory circuitry 112) for multiple peer NAT devices may receive one or more NAT profiles indicating how network address translation for different scenarios or types of traffic should be handled across the multiple peer NAT devices (e.g., in a pre-determined manner, in a reconfigurable manner, etc.).

As examples, the control circuitry may receive a NAT profile for handling full-cone translations across peer NAT devices as described in connection with FIGS. 4, 5A, and 5B, a NAT profile for handling TCP SYN-ACK packets as described in connection with FIGS. 6, 7A, and 7B, a NAT profile for handling ICMP traffic described in connection with FIGS. 8 and 9, and/or other types of NAT profiles as described in connection with FIGS. 2 and 3. Each NAT profile may specify the match criteria (e.g., criteria matching on packets handled by a peer NAT device and the peer forwarding mechanism such as a forwarding interface, a peer device address, etc.).

At block 124, the control circuitry for multiple peer NAT devices may generate and store match and action entries based on the pre-determined NAT handling between the peer NAT devices.

As a first example, based on the received NAT profile for handling full-cone translations, the control circuitry for NAT device 12-1 may generate and store table entry 54-1 at trap table 32-1, while the control circuitry for NAT device 12-2 may generate and store table entry 54-2 at trap table 32-2 (e.g., as shown in FIGS. 4, 5A, and 5B). As a second example, based on the received NAT profile for handling TCP SYN-ACK packets, the control circuitry for NAT device 12-1 may generate and store table entry 82-1 at trap table 32-1, while the control circuitry for NAT device 12-2 may generate and store table entry 82-2 at trap table 32-2 (e.g., as shown in FIGS. 6, 7A, and 7B). As a third example, based on the received NAT profile for handling ICMP traffic, the control circuitry for NAT device 12-2 may generate and store table entries 100 and 102 at trap table 32-2 (e.g., as shown in FIGS. 8 and 9). If desired, some of these NAT profiles and corresponding table entries may be omitted and/or other NAT profiles and corresponding table entries related to peer forwarding of other types of traffic may be included on peer NAT devices 12-1 and 12-2.

At block 126, the control circuitry for multiple peer NAT devices may match and forward matching traffic between each other based on the stored trap table entries. In particular, depending on the application and traffic type, different types of peer forwarding schemes may be used. The embodiments of FIGS. 2-9 illustrate different types of peer forwarding based on different pre-determined criteria (e.g., bidirectional peer traffic forwarding based on a hash value of IP address, protocol, and L4 port, forwarding traffic, bidirectional peer traffic forwarding based on port assignment pool allocation, unidirectional peer traffic forwarding based on active and standby modes of operation, etc.).

In particular, depending on the application, the processing circuitry for a given NAT device may use its NAT table to determine whether a translation exists before using its NAT trap table to determine whether to forward the packet(s) to its peer.

Peer NAT devices, by including match and action entries on a NAT trap table, may enable coordination when splitting (evenly or unevenly) translation handling between the peer NAT devices in a pre-determined and deterministic manner. Configured in this manner, the peer devices can be used to resolve issues with duplicate new address translation assignments in full-cone translations, handling of TCP SYN-ACK packets, and ICMP traffic, just as a few illustrative examples.

The methods and operations described above in connection with FIGS. 1-11 may be performed by the components of a network device and/or system using software, firmware, and/or hardware (e.g., dedicated circuitry or hardware). Software code for performing these operations may be stored on non-transitory computer readable storage media (e.g., tangible computer readable storage media) stored on one or more of the components of the network device and/or system. The software code may sometimes be referred to as software, data, instructions, program instructions, or code. The non-transitory computer-readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device and/or system (e.g., processing circuitry 112 on one or more peer NAT devices 12).

The foregoing is merely illustrative and various modifications can be made to the described embodiments. The foregoing embodiments may be implemented individually or in any combination.

What is claimed is:

1. A method of operating a network address translation (NAT) device, the method comprising:
   receiving, by the NAT device, a network packet having a network address for translation;
   determining whether a translation for the network address exists on the NAT device;
   storing a criterion indicative of one or more types of network packets for which network address translations are performed by a peer NAT network device;
   storing forwarding information for the peer NAT network device and associated with the criterion; and
   forwarding, by the NAT device, the network packet to the peer NAT device based on the criterion and based on determining whether the translation for the network address exists on the NAT device.

2. The method defined in claim 1, wherein forwarding, by the NAT device, the network packet to the peer NAT device is in response to determining that no translation for the network address exists on the NAT device.

3. The method defined in claim 2, wherein the translation is based on a full-cone NAT scheme, and the criterion is based on a source internet protocol (IP) address of the network address and a L4 source port of the network address.

4. The method defined in claim 3, wherein forwarding, by the NAT device, the network packet to the peer NAT device is based on matching on the criterion, and the criterion is whether a hash value of the source IP address, the L4 source port, and a network protocol matches a matching criterion of a table entry.

5. The method defined in claim 4, wherein the matching criterion is whether the hash value is an even hash value.

6. The method defined in claim 3, wherein the network packet is an outgoing packet from a private network to a public network.

7. The method defined in claim 2 further comprising:
   selecting from a range of ports assigned to the NAT device when assigning a new address translation, wherein the criterion is based on a L4 source port of the network address being outside of the range of ports.

8. The method defined in claim 7, wherein the network packet is a transmission control protocol (TCP) SYN-ACK packet.

9. The method defined in claim 7, wherein the network packet is a user datagram protocol (UDP) packet.

10. The method defined in claim 7, wherein the network packet is an incoming packet from a public network to a private network.

11. The method defined in claim 2, wherein the network packet is an internet control message protocol (ICMP) packet, and the criterion is based on an indication that the NAT device does not handle ICMP traffic.

12. The method defined in claim 11, wherein the network packet comprises an echo request message from a private network to a public network or an echo reply message from the public network to the private network.

13. A network address translation (NAT) device comprising:
- a NAT table that includes one or more entries of address translations assigned for different traffic flows;
- a traffic trap table that includes one or more entries for forwarding at least some of network traffic received at the NAT device to a peer NAT device, wherein the one or more entries identify one or more corresponding types of network traffic for which network address translations are handled by the peer NAT device; and
- processing circuitry configured to:
  - forward the one or more corresponding types of network traffic in the received network traffic to the peer NAT device based on matching the received network traffic to one or more matching criteria in each of the one or more entries in the traffic trap table, and
  - perform network address translations for a portion of the received network traffic.

14. The NAT device defined in claim 13, wherein the traffic trap table includes an entry for handling full-cone NAT.

15. The NAT device defined in claim 13, wherein the traffic trap table includes an entry for handling a transmission control protocol (TCP) packet for establishing a TCP connection.

16. The NAT device defined in claim 13, wherein the traffic trap table includes an entry for handling ICMP traffic.

17. The NAT device defined in claim 13, wherein the traffic trap table includes an entry that specifies a forwarding interface on the NAT device and a network address of the peer NAT device.

18. A method of operating a network address translation (NAT) device, the method comprising:
- receiving a NAT profile that specifies a type of packet handled by a peer NAT device;
- storing, by the NAT device, at least one match and action entry based on the type of packet handled by the peer NAT device as specified by the NAT profile;
- receiving, by the NAT device, a network packet having a network address for translation; and
- forwarding, by the NAT device, the network packet to the peer NAT device based on matching between information in the network packet and a match criterion in the at least one match and action entry.

19. The method defined in claim 18 further comprising:
- determining whether an existing address translation for the network address of the network packet is stored on the NAT device prior to forwarding the network packet to the peer NAT device based on matching between the information in the network packet and the match criterion.

20. The method defined in claim 18 further comprising:
- receiving, by the NAT device, an additional network packet having a network address for translation from the peer NAT device, the additional network packet being different from the type of packet handled by the peer NAT device as specified by the NAT profile.

* * * * *